US012791334B2

(12) United States Patent
Luciani

(10) Patent No.: US 12,791,334 B2
(45) Date of Patent: *Nov. 10, 2026

(54) SYSTEMS, METHODS, AND DEVICES FOR GENERATING A TRANSIT ROUTE BASED ON A SAFETY PREFERENCE

(71) Applicant: METROPOLITAN LIFE INSURANCE CO., New York, NY (US)

(72) Inventor: Terrance Luciani, Monroe Township, NJ (US)

(73) Assignee: METROPOLITAN LIFE INSURANCE CO., New York, NY (US)

(*) Notice: Subject to any disclaimer, the term of this patent is extended or adjusted under 35 U.S.C. 154(b) by 56 days.

This patent is subject to a terminal disclaimer.

(21) Appl. No.: 18/890,705

(22) Filed: Sep. 19, 2024

(65) Prior Publication Data

US 2025/0012583 A1 Jan. 9, 2025

Related U.S. Application Data

(63) Continuation of application No. 17/122,902, filed on Dec. 15, 2020, now Pat. No. 12,123,727.

(51) Int. Cl.
*G01C 21/34* (2006.01)

(52) U.S. Cl.
CPC ..... *G01C 21/3461* (2013.01); *G01C 21/3484* (2013.01)

(58) Field of Classification Search
CPC ............ G01C 21/3461; G01C 21/3484; G01C 21/3415
USPC .......................................................... 701/411
See application file for complete search history.

(56) References Cited

U.S. PATENT DOCUMENTS

| | | | | |
|---|---|---|---|---|
| 10,490,078 | B1 | 11/2019 | Fields et al. | |
| 2010/0036599 | A1 | 2/2010 | Froeberg et al. | |
| 2013/0080055 | A1 | 3/2013 | Speier et al. | |
| 2014/0350970 | A1 | 11/2014 | Schumann, Jr. et al. | |
| 2016/0171521 | A1* | 6/2016 | Ramirez ............ | G01C 21/3461 701/409 |
| 2019/0146508 | A1 | 5/2019 | Dean et al. | |
| 2020/0003569 | A1* | 1/2020 | Polanowski ....... | G01C 21/3697 |
| 2020/0072637 | A1 | 3/2020 | Guidotti et al. | |
| 2020/0284601 | A1 | 9/2020 | Myers et al. | |

(Continued)

OTHER PUBLICATIONS

U.S. Appl. No. 17/122,902, Office Action dated Aug. 31, 2022.

(Continued)

*Primary Examiner* — Erin D Bishop
*Assistant Examiner* — Patrick M Brady
(74) *Attorney, Agent, or Firm* — Polsinelli

(57) ABSTRACT

A safe transit route generation system determines a travel route for a user traveling from an origin location to a destination location and generates a route safety value for the travel route based on one or more safety conditions associated with at least one geographic location of the travel route. The system also determines a risk aversion value for the user based on a plurality of safety preferences associated with a user risk profile and that the risk aversion value for the user exceeds the route safety value for the travel route. The system further modifies one or more portions of the travel route to increase the route safety value above the risk aversion value.

14 Claims, 9 Drawing Sheets

(56) References Cited

U.S. PATENT DOCUMENTS

| | | | | |
|---|---|---|---|---|
| 2020/0333150 | A1* | 10/2020 | Shantharam | G01C 21/3492 |
| 2021/0164792 | A1* | 6/2021 | Pal | G01C 21/3453 |
| 2021/0215496 | A1* | 7/2021 | Sese | G01C 21/3697 |
| 2021/0407690 | A1* | 12/2021 | Locke | G06V 20/52 |
| 2025/0259244 | A1* | 8/2025 | Chintakindi | G06Q 30/08 |

OTHER PUBLICATIONS

U.S. Appl. No. 17/122,902, Final Office Action dated Feb. 28, 2023.
U.S. Appl. No. 17/122,902, Office Action dated Jul. 19, 2023.
U.S. Appl. No. 17/122,902, Final Office Action dated Feb. 23, 2024.
U.S. Appl. No. 17/122,902, Notice of Allowance dated Jun. 20, 2024.

* cited by examiner

700

SYSTEMS, METHODS, AND DEVICES FOR GENERATING A TRANSIT ROUTE BASED ON A SAFETY PREFERENCE

CROSS-REFERENCE TO RELATED APPLICATION

The present application is a continuation of, and claims priority to, U.S. Non-Provisional patent application Ser. No. 17/122,902, filed Dec. 15, 2020, the disclosures of which are incorporated herein by reference.

TECHNICAL FIELD

The present disclosure relates generally to transit systems, and more particularly to a comprehensive system and processes for generating or altering a transit route based on conditions of the route and safety preferences.

BACKGROUND

Routing programs provide a suggested transit route between two locations for many types of modes of transportation, such a biking, walking, driving, etc. For example, routing programs utilizing Global Positioning Systems (GPS) to generate a suggested transit route for a user are ubiquitous in vehicles, mobile phones, smartwatches, etc. Routing programs often receive an origination location (often the current location of a user or device) and a destination location, calculate a route between the locations, and display the route on a user device. These existing routing applications, however, often prioritize fastest routes and/or shortest distances to travel from the origination location to the destination location, disregarding other factors of travel which may be important for a user in selecting a particular route by which to travel between the two locations. For example, routing programs fail to account for the safety of the route (e.g., avoiding areas with high crime, road quality, potential areas of potential pathogen transmission, etc.) or individual safety for the person or persons traveling (e.g., disabilities, vehicle type, demographic information, etc.). By ignoring safety concerns of a traveler or of the suggested transit route, the traveler may be directed to transit through a neighborhood with high crime rates at dangerous times of day or directed through an area infected with an airborne disease, endangering the health and well-being of the traveler and passengers traversing the suggested transit route.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

According to one or more embodiments of the disclosure, a safe transit route generation system determines a travel route for a user traveling from an origin location to a destination location and generates a route safety value for the travel route based on one or more safety conditions associated with at least one geographic location of the travel route. The system also determines a risk aversion value for the user based on a plurality of safety preferences associated with a user risk profile and determines that the risk aversion value for the user exceeds the route safety value for the travel route. The system further modifies one or more portions of the travel route to increase the route safety value above the risk aversion value. These and other features will be discussed herein with respect to various exemplary embodiments of the disclosed stress monitoring and intervention system.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

As also used herein, the term "user" shall be considered to mean a user of an electronic device(s). Actions performed by a user in the context of computer software shall be considered to be actions taken by a user to provide an input to the electronic device(s) to cause the electronic device to perform the steps embodied in computer software. In some instances a user can refer to a user account associated with a particular electronic device.

A transit route generation environment typically includes a communication network, which is a geographically distributed collection of devices or nodes interconnected by communication links and segments for transporting data there-between. The devices include, for example, electronic devices such as personal computers, laptops, tablets, mobile phones, and the like. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
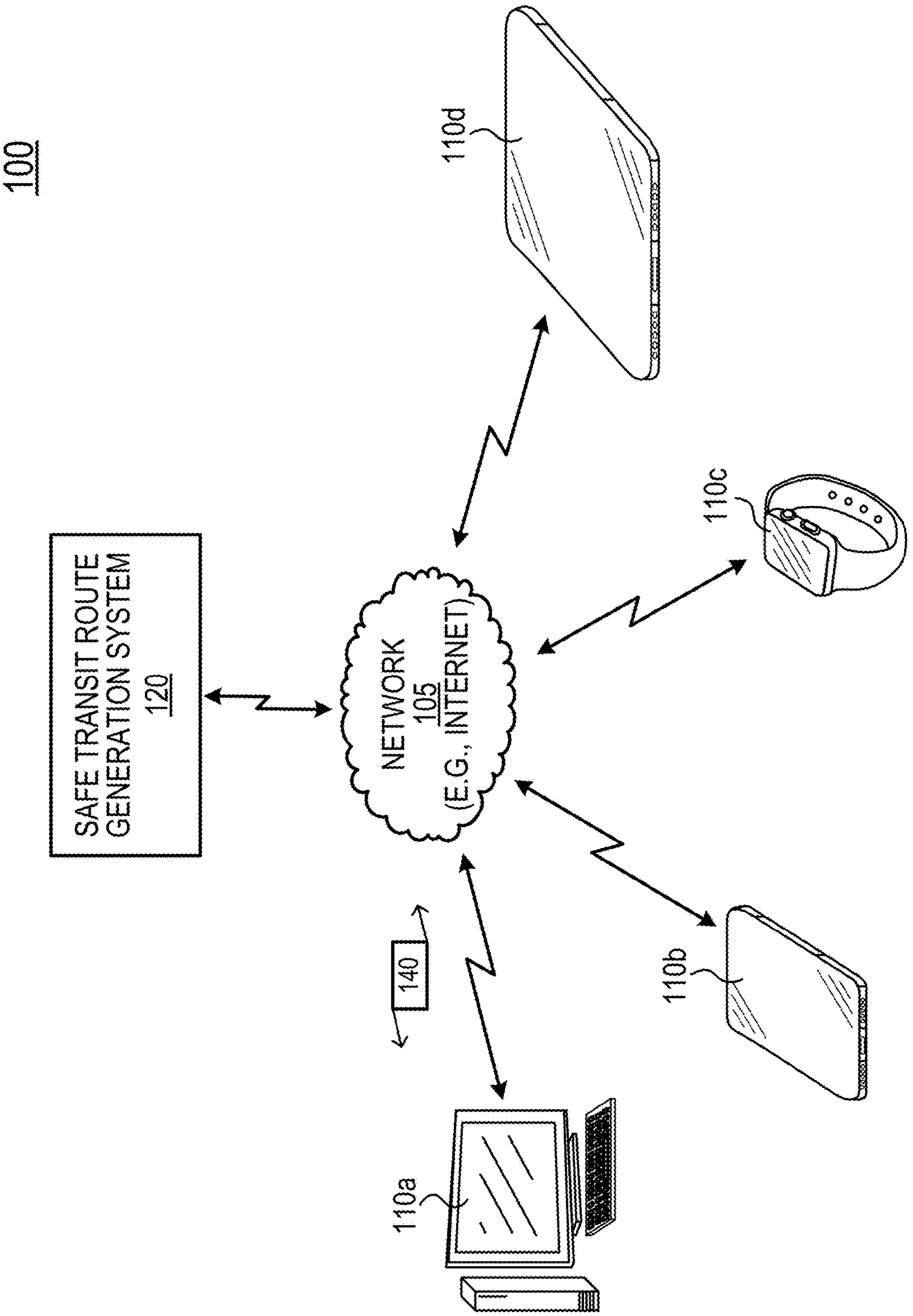
FIG. 1 illustrates a schematic diagram of an example transit route generation environment, showing a safe transit route system that communicates with various client devices over a network.

Referring to the figures, FIG. 1 illustrates a schematic diagram of a transit route generation environment 100, which includes an example communication network 105 (e.g., the Internet). Communication network 105 is shown for purposes of illustration and represents various types of networks, including local area networks (LANs), wide area networks (WANs), telecommunication networks (e.g., 4G, 5G, etc.), and so on.

As shown, communication network 105 includes a geographically distributed collection of devices, such as client devices 110*a*, 110*b*, 110*c*, and 110*d* (collectively devices 110). Client devices 110 are interconnected by communication links and/or network segments and exchange or transport data such as data packets 140 to/from a safe transit route generation system 120 or platform. As shown, client devices 110 include a computer 110*a*, a mobile device 110*b*, a smart watch 110*c*, and a tablet 110*d*. The illustrated client devices show specific electronic devices, but it is appreciated that client devices 110 in the broader sense are not limited to such specific electronic devices. For example, devices 110 can include any number of electronic devices such as laptops, wearable smart devices, smart glasses, vehicle systems, and so on. In addition, those skilled in the art will understand that any number of devices and links may be used in communication network 105, and that the views shown by FIG. 1 is for simplicity and discussion. In many instances, devices 110 include route generating application or program and one or more location services, such as a Global Position System (GPS) for determining a geographic location of the device. Other location services may also be incorporated with devices 110 for use in determining a location of the device.

Data packets 140 represent network traffic or messages, which are exchanged between devices 110 and safe transit route generation system 120 over communication network 105 using predefined network communication protocols such as wired protocols, wireless protocols (e.g., IEEE Std. 802.15.4, WiFi, Bluetooth®, etc.), PLC protocols, or other shared-media protocols where appropriate. In this context, a protocol consists of a set of rules defining how devices or nodes interact with each other.

Figure 2:
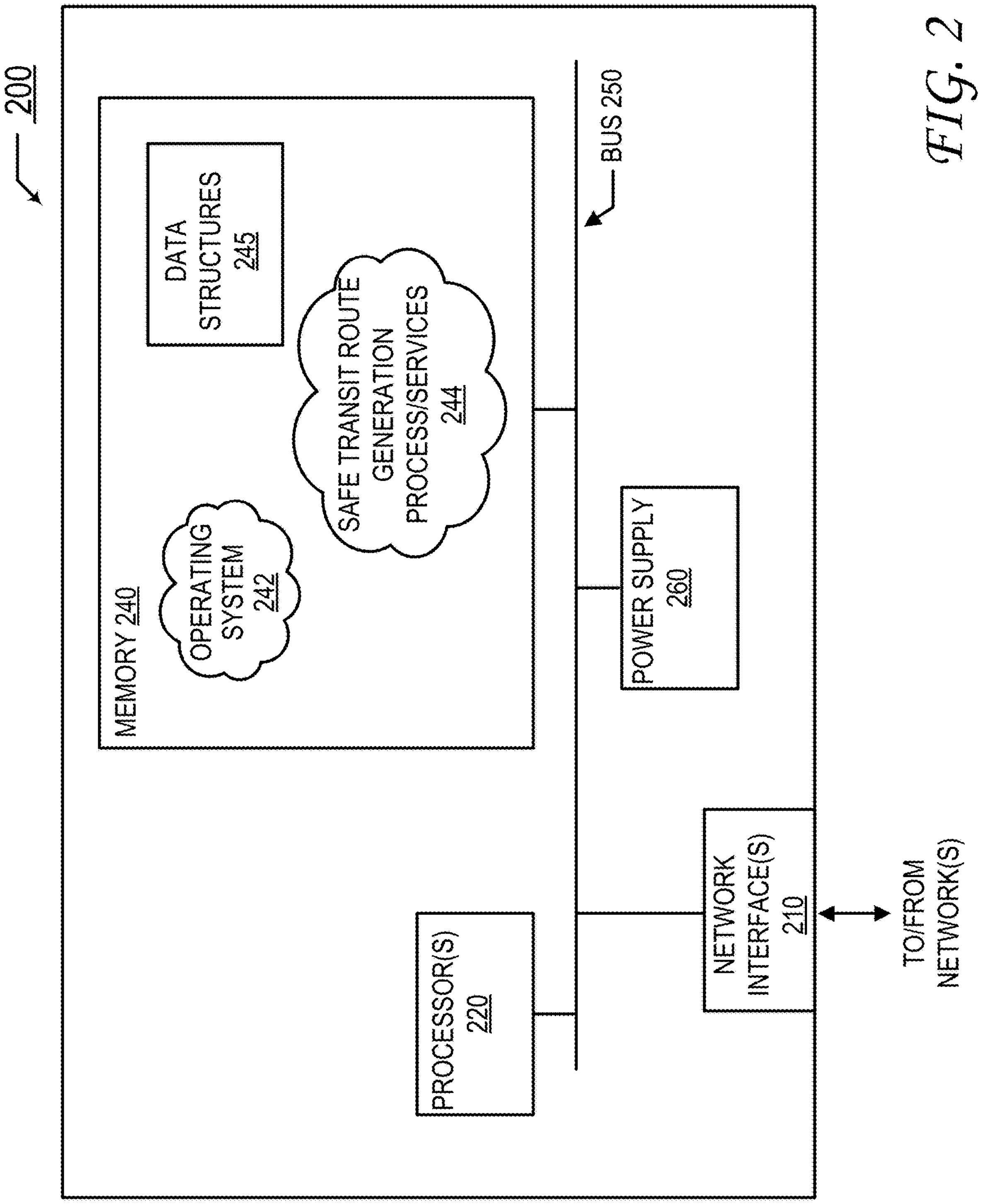
FIG. 2 illustrates a schematic diagram of an example safe transit route generation device.

FIG. 2 is a schematic block diagram of an example device 200 that is used with one or more embodiments described herein, e.g., as a component device of the safe transit route generation system 120 and/or as any one of devices 110 shown in FIG. 1. Device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 contain the mechanical, electrical, and signaling circuitry for communicating data over the communication links coupled to communication network 105. Network interfaces 210 may be configured to transmit and/or receive data using a variety of different communication protocols. Network interface 210 is shown for simplicity, and it is appreciated that such interface may represent two different types of network connections, e.g., wireless and wired/physical connections. Also, while network interface 210 is shown separately from power supply 260, for PLC the interface may communicate through power supply 260, or may be an integral component of the power supply. In some specific configurations the PLC signal may be coupled to the power line feeding into the power supply. In addition, it is appreciated that network interfaces 210 can be compatible with the Open Application Program Interface (API) specification to communicate with a variety of new devices, peripherals, etc.

Memory 240 comprises a plurality of storage locations that are addressable by processor 220 and network interfaces 210 for storing software programs and data structures associated with the embodiments described herein. Note that certain devices may have limited memory or no memory (e.g., no memory for storage other than for programs/processes operating on the device and associated caches).

Processor 220 comprises hardware elements or hardware logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may comprise safe transit route generation process/services 244, described herein. Note that while safe transit route generation process/services 244 is shown in centralized memory 240, alternative embodiments provide for the process to be specifically operated within network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the stress monitoring and intervention process 244 is shown as a standalone process, those skilled in the art will appreciate that this process may be executed as a routine or module within other processes.

As noted above, many routing programs generate proposed routes based on the smallest travel time and/or shortest distance from an origination location to a destination location. These routing programs fail, however, to account for the safety of the route (e.g., avoiding areas with high crime, road quality, potential areas of potential pathogen transmission, etc.) or individual safety for the person or persons traveling (e.g., disabilities, vehicle type, demographic information, etc.). Further, individuals may accept different levels of risk when traversing along a path or route. For example, one individual may feel safe riding a bicycle through a downtown area while another may prefer to avoid such areas when biking or walking. Providing a route based on safety considerations from the origination location to the destination location may reduce the potential for harm to a traveler during transit and improve the transit experience for the traveler.

The techniques described herein provide a safe transit route generation system that generates a route or modifies a suggest transit route based on one or more safety considerations. In one particular implementation, the system and/or methods may generate an individual risk profile associated with a user of the system that stores personal safety/risk preferences of the user. The individual risk profile may also calculate and store a risk aversion value that indicates a general level of risk aversion for the user. The risk profile may include both static preferences or conditions of the user (such as demographic information, disability information, vehicle type and conditions, long-term health conditions of the user, and the like) and dynamic preferences and conditions (such as number and type of passengers traveling with the user, medications of the user, one or more current or recent bio-measurements of the user, mode of transportation for the route, and the like). The risk aversion value for the user may also include both static and dynamic user preferences.

The risk aversion value for the user may be compared to a safety score determined for segments of a proposed transit route from the origination location to the destination location. The safety score for the route segments may be based on static (or known) conditions and/or dynamic (or monitored) conditions on or around the segments. Static safety conditions of the route segments may include, but are not limited to, historic crime data, an indication of a road quality, the outbreak of a pathogen in the area, a measurement of the air quality, the like. Dynamic safety conditions may include, but are not limited to, weather data in a geographic area near the segments, real-time accident reporting, a period of time in which traversal of the segment is expected, news reports associated with the segments, and the like. The transit route generation system compares the risk aversion value for a user to the one or more safety scores for the segments of a proposed transit route and, if the safety score exceeds a user's risk aversion value, one or more alternate transit routes may be provided to the user as a "safe" route for transit.

Figure 3:
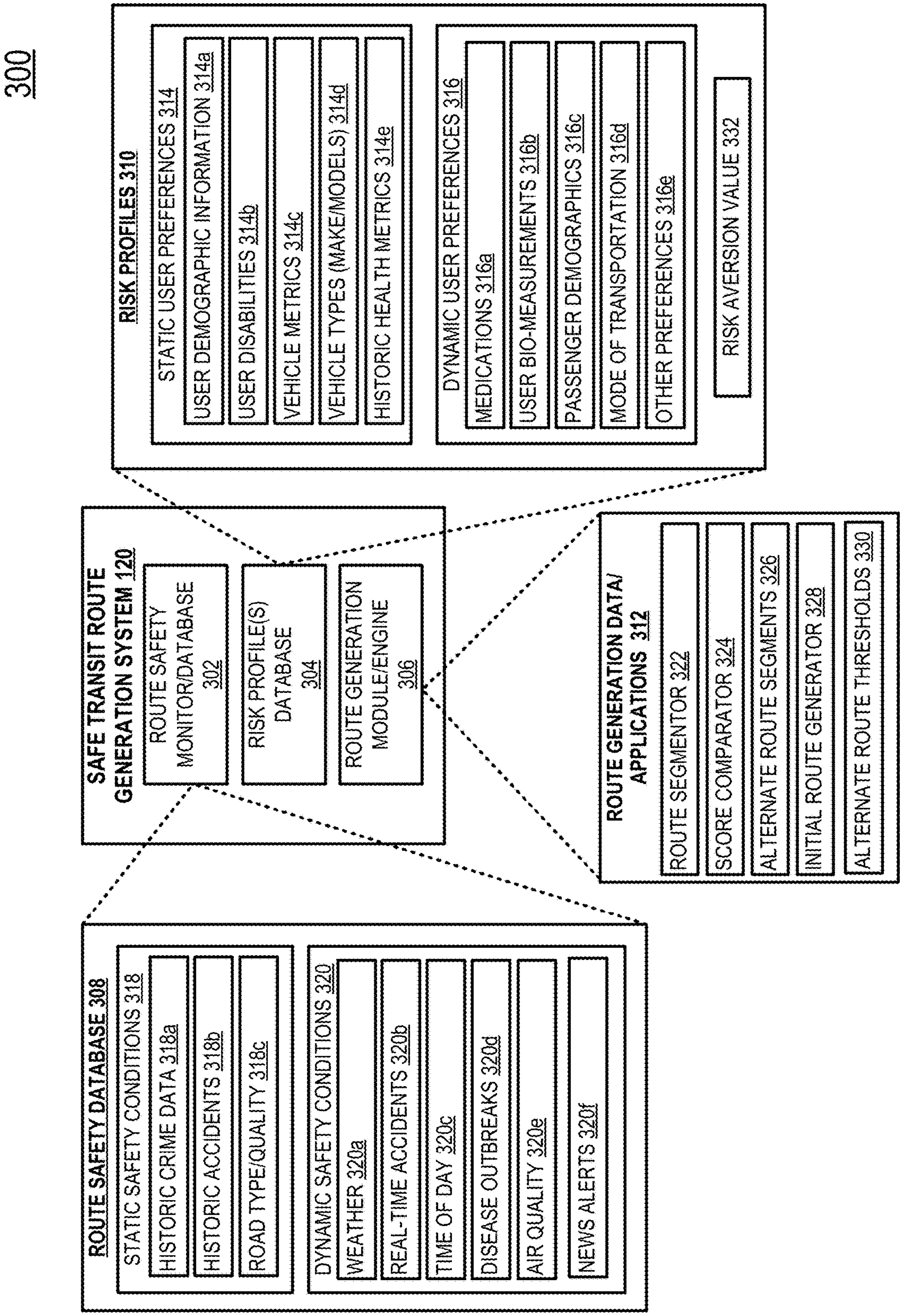
FIG. 3 illustrates a schematic block diagram of the safe transit route generation system shown in FIG. 1, further showing a route safety monitor/database, a risk profile(s) database, and route generation module/engine.

FIG. 3 illustrates a schematic block diagram 300 of the safe transit route generation system shown in FIG. 1, further showing a route safety monitor/database 302, a risk profile(s) database 304, and a route generation module/engine 306.

In operation, route safety monitor/database 302 monitors or accesses route safety database 308 that indicates a safety condition of a transit route or segments of a transit route. Route safety database 308 includes static or historic safety conditions 318 and dynamic safety conditions 320 associated with the transit route. Here, static safety conditions 318 include, for example, historic crime data 318*a* associated with the transit route, historic data of accidents 318*b* occurring on or near the transit route, and/or an indication of a road type (highway, freeway, residential, dirt road, etc.) and estimated quality of a road surface 318*c* for the transit route. Dynamic safety conditions 320 of route safety database 308 includes, but is not limited to, weather data 320*a* (including historic, current, or forecasted), real-time accident 320*b* reporting data, a time of day 320*c* (including day of the week, month of the year, etc.), indications of potential pathogens 320*d* in the same geographic area as the transit route, data indicating the air quality 320*e*, news alerts of events occurring the area 320*f*, and the like. Additional data and/or indicators may be included in route safety database 308 to determine a safety score for a transit route, as explained in more detail below.

Route safety monitor 302 monitors one or more databases of safety information to obtain static safety conditions 318 or dynamic safety conditions 320. For example, route safety monitor 302 may access a database of crime statistics to obtain historic crime data 318*a* on or near a geographic location of the transit route. In another example, route safety monitor 302 may execute one or more applications to obtain other information, such as weather information 320*a*, real-time accident information 320*b*, air quality 320*e*, and the like. One or more application programming interfaces (APIs) may be executed or otherwise utilized by route safety monitor 302 to communicate with the various databases of information and/or applications to obtain route safety database 308. In addition, route safety monitor 302 stores obtained route safety database 308 in one or more databases for use in generating or altering a safe transit route.

Risk profile(s) database 304 represents a repository of risk profiles for respective users. Here, risk profile(s) database 304 illustrates a risk profile 310 for a representative user, such that other users may similarly be associated with a risk profile maintained by risk profile database 304. Risk profile 310 includes static user preferences 314 and/or dynamic user preferences 316. In one implementation, the information included in risk profile 310 of a user may be received from a user device or other device through which the user provides safety preferences. Static user preferences 314 includes, but is not limited to, user demographic information 314*a*, such as the user's age, sex, marital status, location of residence, and the like. Static user preferences 314 also includes an indication of disabilities 314*b* of the user, metrics associated with some type of a vehicle 314*c* or other mode of transportation (such as a number of miles driven by a car, a manufacturing year of a bicycle, a maintenance report of a motorcycle, etc.), a vehicle type (such as a make and model of a car, bicycle, motorcycle, etc.), and/or historic health metrics of the user (such as a history of heart issues, yearly check-up information, and the like).

Risk profile 310 also includes dynamic user preferences 316, which includes an indication of medications 316*a* taken by the user and/or bio-measurements 318*b* of the user. For example, a wearable device associated with the user may obtain bio-measurements of the user, such as a resting heartrate, number of steps walked in a period of time, sleep habits, etc. and provide the bio-measurements to risk profile database 304 for inclusion in dynamic user preferences 316. Dynamic user preferences 316 also includes demographic information of passengers 316*c* that may travel a transit route (such as a number, age, sex, etc. of passengers in a car), an intended mode of transportation 316*d* used to traverse the transit route, or any other user preference 316*e*, such as a user's desire to avoid political demonstrations, rainy weather, particular sensitivities to loud noises, smells, bright lights, etc., personal geographic areas to avoid, and the like.

Risk profile 310 of a user also includes a risk aversion value 332 generated from the data of static user preferences 314 and/or dynamic user preferences 316. As explained in more detail below, risk aversion value 332 may be a combination of values based on the user preferences in risk profile 310 of the user and risk-related score that may be compared to a safety value associated with a transit route to determine if the safety of the route exceeds the user's risk preferences. In some implementations, risk aversion value 332 for the user may not be stored in the risk profile but may instead be calculated by route generation module/engine 306 based on the user preference data of risk profile 310.

Route generation module/engine 306 includes route generation data and/or applications 312 to generate a safe transit route or alter an initial transit route to a safe transit route based on the information stored in route safety database 302 and/or risk profile database 304. As explained in more detail below, route generation data/applications 312 includes a route segmentor 322 for segmenting a transit route into a plurality of route segments and storing the route segments. A score comparator 324 compares risk aversion value 332 of a user of safe transit route generation system 120 to safety values of the segments of the transit route to determine if one or more of the safety values of the segments of the transit route exceed user risk aversion value 332. Route generation data 312 includes one or more alternate route segments 326 for inclusion in a transit route when a safety value associated with a segment of the transit route exceeds user's risk aversion value 332.

Router generation data/applications 312 also includes an initial route generator 328 for generating an initial transit route from an origination location to a destination location that may be segmented by route segmentor 322. One or more alternate route thresholds 330 are also stored in route generation data/applications 312. Alternate route thresholds 330 represent boundaries or tolerances for selecting to replace a segment of the transit route. For example, an alternate segment may not be selected for a transit route based solely on the safety value for the segment exceeding risk aversion value 332 for the user. Rather, other considerations, such as an amount of estimated travel time added to the adjusted transit route, a type of road of the alternate segment, one or more weights applied to the user preferences of risk profile 310, and the like may be used to determine a safe transit route, one or more of which may include an associated threshold value 330. In some examples, a user can adjust alternate route threshold(s) 330 and/or a user can add additional complimentary thresholds.

Figure 4:
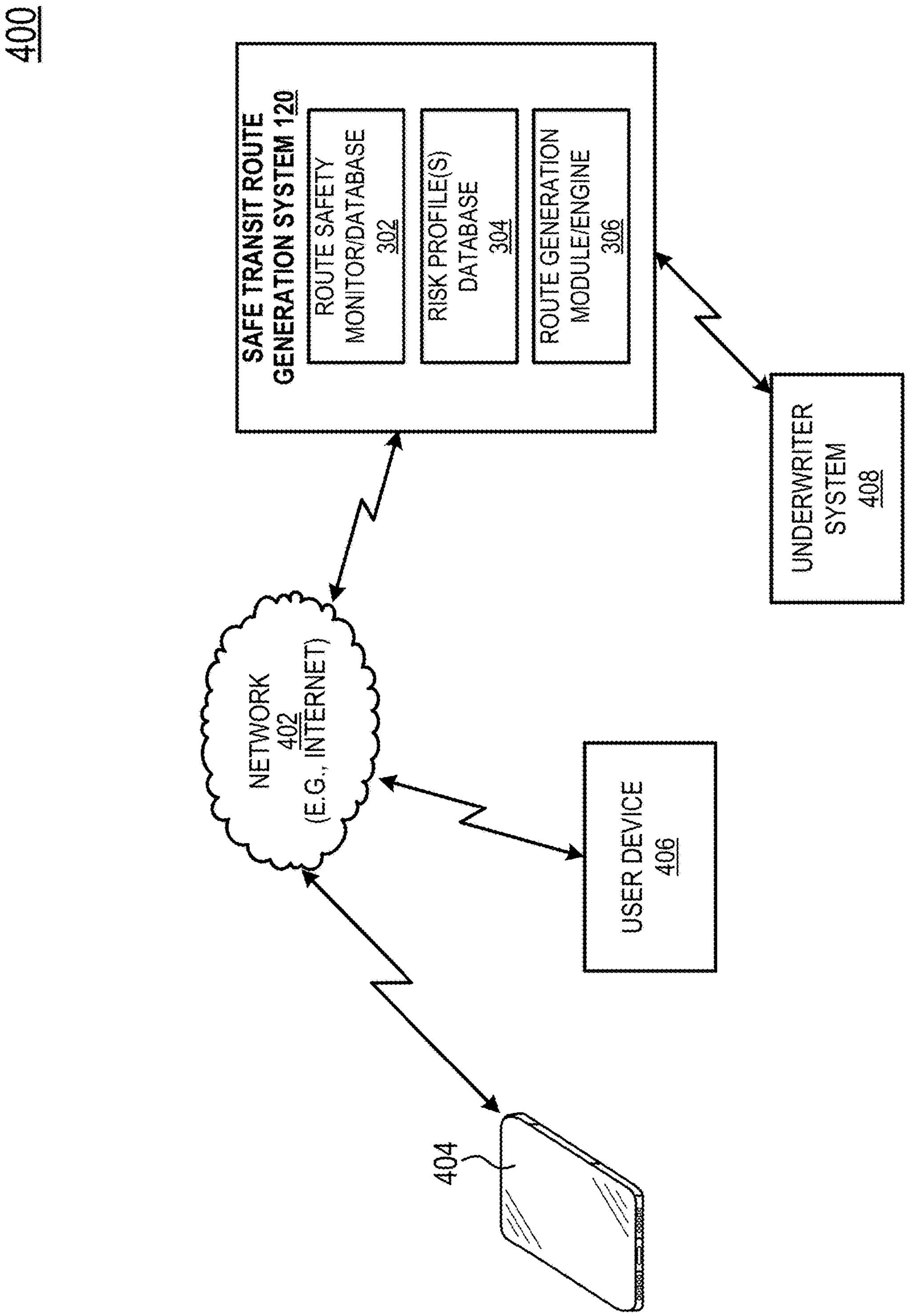
FIG. 4 illustrates a schematic block diagram, showing the transit route generation system shown in FIG. 1, further showing interactions with devices and systems to generate a safe transit route.

FIG. 4 illustrates a schematic block diagram 400 showing transit route generation system 120 shown in FIG. 1, further showing interactions with devices and systems to generate a safe transit route. As described above, safe transit route generation system 120 includes a route safety monitor/database 302, a risk profile(s) database 304, and a route generation module/engine 306. One or more devices may communicate with safe transit route generation system 120 via a network 402, such as the Internet, although other public or private communication networks are contemplated for use with the safe transit route generation system. In the example illustrated in FIG. 4, a route display device 404 and a user device 406 communicate with safe transit route generation system 120 via the network 402. Route display device 404 may, among other functions, display a transit route from an origination location to a destination location based on inputs provided to a route generation application. The displayed route may include features of the transit route, such as an overhead map or any other visual indicator to aid a user in understanding the displayed transit route. The route generation application may be executed by route display device 404, in one implementation. In another implementation, a computing device other than route display device 404, such as route generation module/engine 306 of safe transit route generation system 120, may execute the route generation application to generate an initial transit route. Regardless, the route generation application may receive an origination location and a destination location and determine a transit route between the locations. In some implementations, route display device 404 is a GPS device or a mobile computing device executing a route generation application.

User device 406 also communicates with safe transit route generation system 120 via network 402. User device 406 may be any computing device through which a user may provide information, data, commands, or other communications to safe transit route generation system 120. In one particular example, a user of user device 406 provides the origination location and the destination location for the transit route to safe transit route generation system 120. In another example, a user provides one or more safety preferences through user device 406 for inclusion in the risk profile associated with the user. In still other implementations, user device 406 and route display device 404 may be the same device such that the user may provide safety preferences and receive a transit route on the same device.

An underwriter system 408 also communicates with safe transit route generation system 120, either through a direct communication connection or through network 402. As explained in more detail below, underwriter system 408 obtains information associated with one or more users of safe transit route generation system 120, including user risk profiles from risk profile database 304 and or generated safe transit routes generated by the safe transit route generation system for users of the system. Such information may be used by underwriter system 408 to generate one or more user profiles, generate discounts or other rewards for the users (such as adjustments to an auto insurance or life insurance policy), or otherwise process analytic information from the operation of safe transit route generation system 120.

Figure 5:
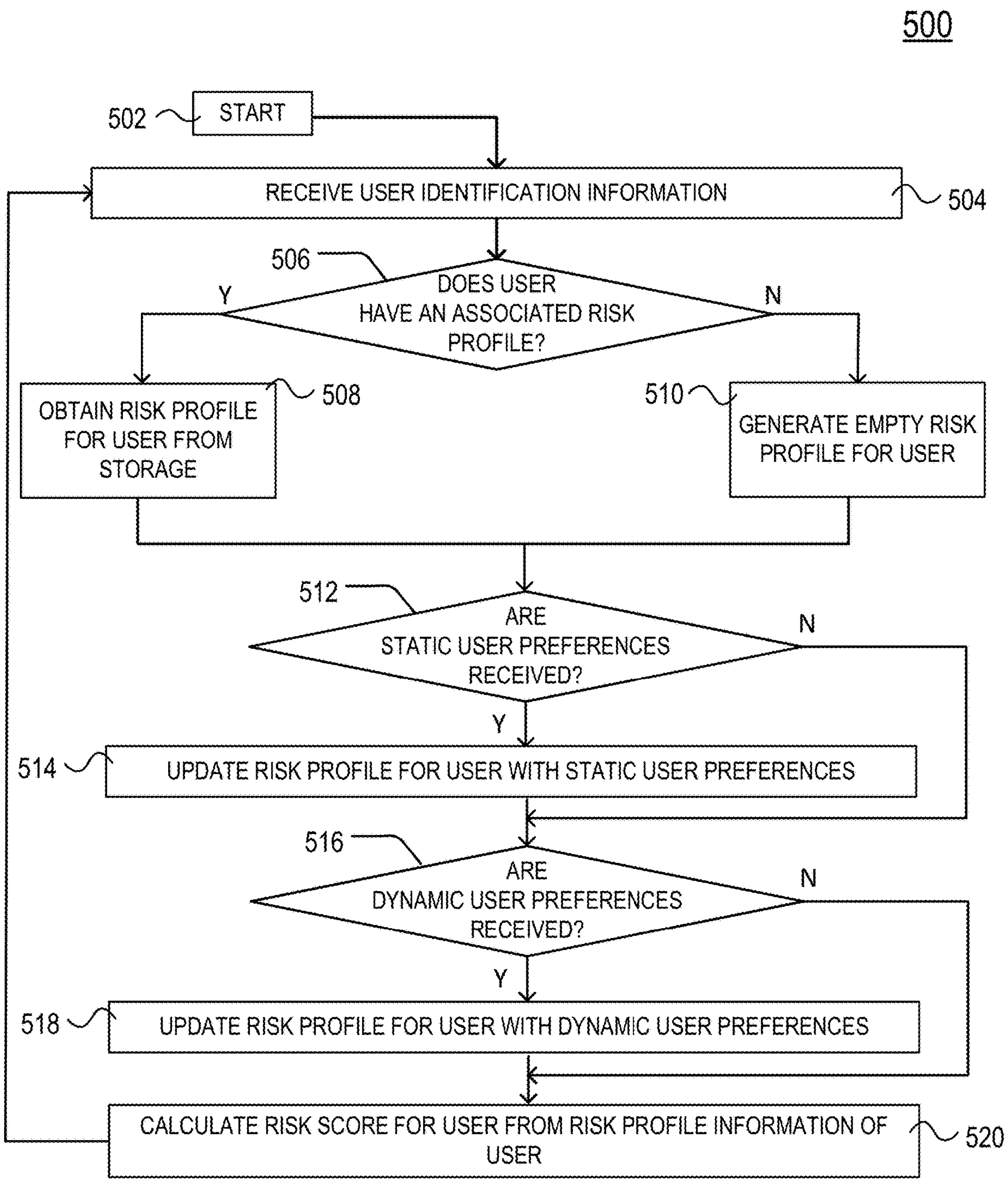
FIG. 5 illustrates a schematic block diagram of a flowchart for generating a risk profile of user safety preferences for a user of the safe transit route system.

FIG. 5 illustrates a schematic block diagram of a flowchart 500 for generating a risk profile 310 of user safety preferences for a user of safe transit route system 120. The operations of flowchart 500 are described herein with reference to environment 400 of FIG. 4, although other environments or platforms may perform one or more of the operations of flowchart 500. In one particular implementation, the operations may be performed by components, programs, applications, modules, etc. of safe transit route generation system 120. The operations may be performed using one or more hardware components of safe transit route generation system 120, one or more programs of the safe transit route generation system, or a combination of hardware and software components.

Flowchart 500 starts at 502, when the safe transit route generation system 120 receives user identification information (operation 504) from a user device. For example, a user of user device 406 inputs a username and password to the user device for transmission to safe transit route generation system 120. In another example, the user identification information inputs through route display device 404 for transmission to safe transit route generation system 120. In still another example, a unique identifier associated with user device 406 is transmitted to safe transit route generation system 120 as the user identification information. One or more applications, such as an API or mobile application, may be executed on user device 406 to provide a user interface through which the user identification information may be provided to safe transit route generation system 120. Safe transit route generation system 120, in operation 506, determines if the user associated with the user identification information has a previously stored risk profile 310. As mentioned above, a risk profile 310 associated with users of safe transit route generation system 120 is stored or otherwise maintained by risk profile(s) database 304. Risk profiles 310 is associated with a user identifier such that safe transit route generation system 120 determines if the provided user identifying information is associated with a risk profile. If the user identification information is associated with a risk profile 310, the profile is obtained from a storage device or a database in operation 508. If the user identification information is not associated with a stored risk profile 310, an empty risk profile is generated for the user in operation 510. Empty risk profile 310 is stored in risk profile(s) database 304.

In operation 512, it is determined if static user preferences 314 are received from the user. As mentioned above, static user preferences 314 includes, but are not limited to, such information as user demographic information 314*a*, an indication of disabilities 314*b* of the user, metrics associated with some type of a vehicle 314*c* or other mode of transportation, a vehicle type, and/or historic health metrics of the user. In general, static user preferences 314 are information or preferences that are not likely to change rapidly over time. In one instance, static user preferences 314 is provided to safe transit route generation system 120 through user device 406, perhaps through a user interface executed on the user device, through route display device 404, or through any other computing device. Static user preferences 314 is obtained, in one example, upon registering the user with safe transit route generation system 120.

If it is determined that static user preferences 314 are received, the preferences are added to the corresponding risk profile 310 of the user in risk profile(s) database 304 in operation 514. Adding received static user preferences 314 to risk profile 310 may include inserting a new entry into risk profile 310 or may include updating, amending, or altering an existing entry in the risk profile. In one implementation, static user preferences 314 is received or translated into a common language format supported by risk profile 314 and/or safe transit route generation system 120. For example, demographic information 314*a* of the user may be stored in risk profile 310 in a particular format such that the information may be retrieved and processed by safe transit route generation system 120. Such information may be encoded into one or more codes or alphanumeric strings that may be understood by safe transit route generation system 120 to generate a risk preference associated with the encoded information. The common format for the stored information in risk profile 310 may also allow safe transit route generation system 120 to search the profiles for user information, combine different preferences, quantify preferences, or otherwise process the stored information for one or more of the operations or methods described herein.

After updating risk profile 310 with static user preferences or if it is determined that no static user preferences are received from the user, it is determined if dynamic user preferences 316 or information is received in operation 516. As explained above, dynamic user preferences 316 includes, but are not limited to, such information as an indication of medications 316*a* taken by the user, bio-measurements 318*b* of the user, demographic information of passengers 316*c* that may travel a transit route, an intended mode of transportation 316*d* used to traverse the transit route, or any other user preference 316*e* of the user that may change over time. Dynamic user preferences 316 are also provided to safe transit route generation system 120 through user device 406, perhaps through a user interface executed on the user device, through route display device 404, or through any other computing device. Dynamic user preferences 316 are obtained, in one implementation, upon request by a user to receive a safe route from safe transit route generation system 120 based on an intended transit by the user. For example, the user may transmit a request for a route between an origination location and a destination location through the user interface of user device 406. The user interface may prompt or otherwise collect dynamic user preferences from the user, such as the intended mode of transportation (walking, biking, driving, etc.), the number and types of passengers, recent health conditions, and the like. This information is added to user's risk profile 310 as dynamic user preferences 316 as used, as described below, to generate a safe transit route for the user based on the request.

Similar to above, if it is determined that dynamic user preferences 316 are received, the preferences are added to corresponding risk profile 310 of the user in risk profile(s) database 304 in operation 518. Adding received dynamic user preferences 316 to risk profile 310 may include inserting a new entry into risk profile 310 or may include updating, amending, or altering an existing entry in the risk profile. Similar to static user preferences 314, dynamic user preferences 316 is received or translated into a common language format supported by risk profile 314 and/or safe transit route generation system 120 and stored in a searchable table of common format information and data.

After updating risk profile 310 with dynamic user preferences 316 or if it is determined that no dynamic user preferences are received from the user, a risk aversion value 332 is calculated for the user based on the information in user's risk profile 310 in operation 520. In general, risk aversion value 332 is a quantification of the user preferences of risk profile 310. In one example, the information of risk profile 310, both static user preferences 314 and dynamic user preferences 316, is associated with a numeric value indicating a severity of the preference. In another example, a user associated with risk profile 310 provides the numeric values to indicate a severity of one or more of the user preferences. Risk aversion value 332 translates the quantifications of the user preferences of risk profile 310 into a normalization scale of values. For example, the numeric values of the user preferences may be summed and the sum divided by a value of 10 to achieve a risk aversion value 332 between 0 and 10. Various other techniques and methods for quantifying the user preferences of risk profile 310 into a risk aversion value 332 may also be implemented in safe transit route generation system 120 and the techniques described herein are but an example of such quantification.

In some implementations, multiple risk aversion values 332 for a user of risk profile 310 is calculated and/or stored based on a relevancy of user preferences 314, 316 to a requested transit route. For example, a user may request a safe transit route for walking between an origination location to a destination location. Some user preferences, such as vehicle metrics 314*c* and vehicle types 314*d*, may not be relevant for a walking transit route. In this circumstance, risk aversion value 332 is not include the quantifications of some user preferences that are not relevant to the mode of travel. In another example, a safe transit route request for driving disregards user preferences 314, 316 that are not related to driving the route, such as user preferences to avoid being outside in a particular area such that those preferences are not selected for inclusion in the calculation of risk aversion value 332 for that route. In still another example, a user preference is relevant for a time of day, such as geographic areas to avoid at night but not in daylight. In this example, calculating risk aversion value 332 for the user may include the user preference if the transit of the travel route is to occur during the night, but may not be included in the time of travel is during the day. In this manner, multiple risk aversion values 332 are calculated and stored or otherwise associated with risk profile 310 for the user.

Through flowchart 500 shown in FIG. 5, safe transit route generation system 120 or other computing devices or systems generate or update risk profiles 310 for inclusion in risk profile(s) database 304 of safe transit route generation system 120. Users of safe transit route generation system 120 are associated with personal risk profile 310 containing the user's safety preferences and risk aversion value 332. In some implementations of safe transit route generation system 120, more than one user is associated with the same risk profile 310. For example, a general risk profile may be associated with a group of similar users, such as users from the same geographic location, users of similar demographics, or for all users of safe transit route generation system 120. The user preferences for general risk profiles 310 are populated with general safety preferences by safe transit route generation system 120 in addition or without specific user preferences. In this manner, the information of risk profiles 310 is supplied by any computing device, system, user, administrator, etc. and is associated with any number of users of safe transit route generation system 120.

Figure 6:
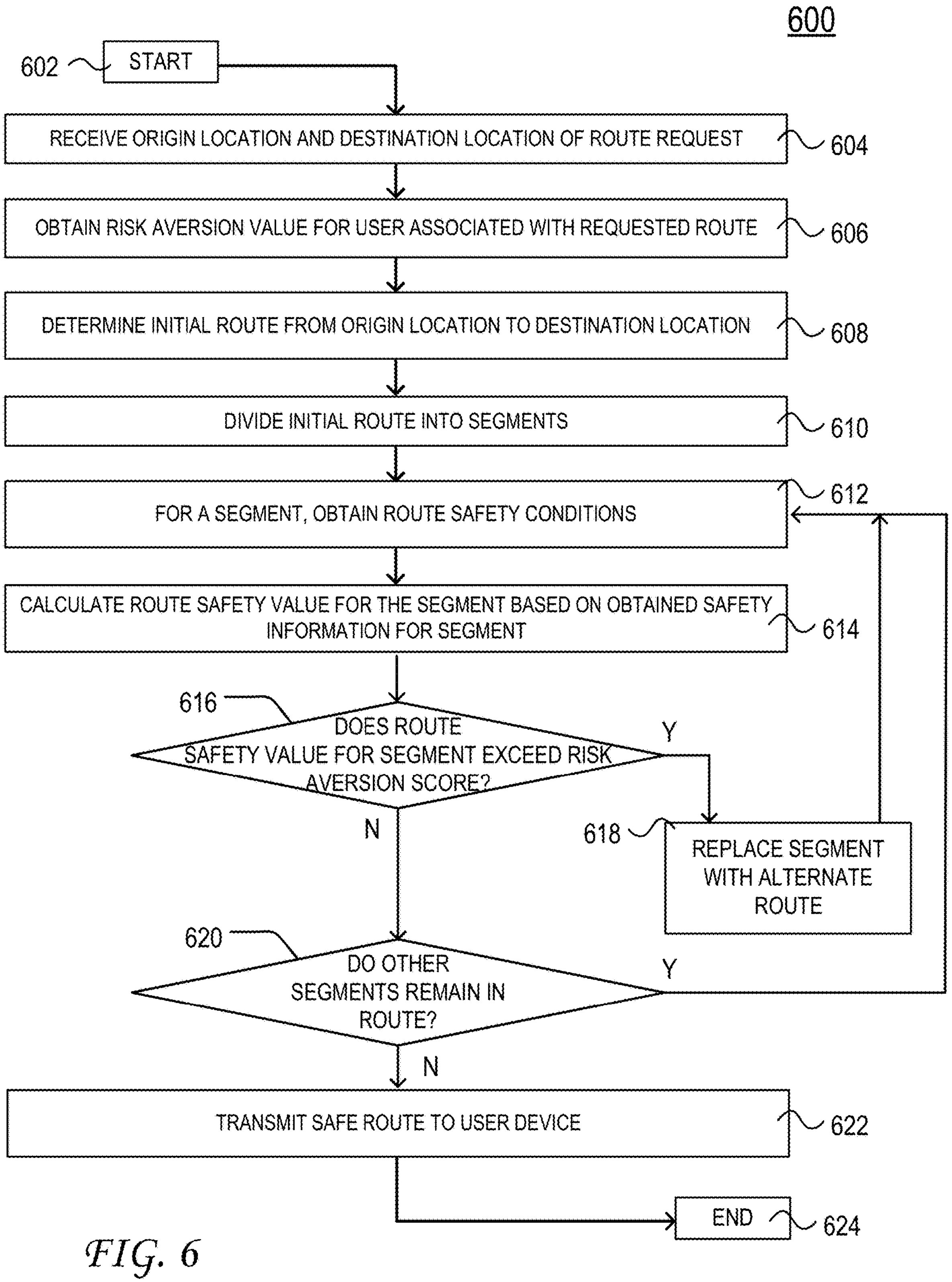
FIG. 6 illustrates a schematic block diagram of a flowchart for generating a safe transit route based on a user risk profile and monitored safety conditions of a route.

FIG. 6 illustrates a schematic block diagram of a flowchart 600 for generating a safe transit route based on user risk profile 310 and monitored safety conditions of an initial route. The operations of flowchart 600 are described herein with reference to environment 400 of FIG. 4, although other environments or platforms may perform one or more of the operations of the method. In one particular implementation, the operations may be performed by components, programs, applications, modules, etc. of safe transit route generation system 120. The operations may be performed using one or more hardware components of safe transit route generation system 120, one or more programs of the safe transit route generation system, or a combination of hardware and software components.

Flowchart 600 starts at step 602 and continue to operation 604 where safe transit route generation system 120 receives on origination location and a destination location of a route request. The origination location and the destination location is received from route display device 404 or user device 406 based on inputs provided to the corresponding device by a user. For example, the user indicates a current location as an origination location and a destination location in user device 406 and select to transmit the locations to safe transit route generation system 120 via network 402. The locations may be geographic locations of an origination and a destination, although other identifiers of locations (such as names, descriptions, user-provided labels, etc.) may also be used to identify the locations. In one particular implementation, route display device 404 or user device 406 provides an initial transit route from the origination location to the destination location based on any routing techniques or considerations, such as shortest distance and/or shortest travel time. In another implementation, the user or devices provide the origination location and destination location to safe transit route generation system 120 to request a safe transit route between the locations.

In operation 606, safe transit route generation system 120 obtains risk aversion value 332 from risk profile 310 of a user associated with the origination location and destination location. For example, the origination location and/or destination location may be included in a safe route request received at safe transit route generation system 120. The route request also includes a user identifier or user-associated device identifier, such as a unique identifier of user device 406. Safe transit route generation system 120 accesses risk profile 310 from risk profile(s) database 304 associated with the received user identifier. In another example, user device 406 or route display device 404 provides an initial transit route associated with a user identifier. The user identifier is then be utilized to access risk profile 310 from risk profile(s) database 304. In particular, risk aversion value 332 stored within or otherwise associated with risk profile 310 for the user is obtained by safe transit route generation system 120.

Further and as mentioned above, risk aversion value 332 obtained is calculated based on a relevancy of particular user preferences 314, 316 to a requested transit route. For example, particular user preferences 314, 316 may be included in risk aversion value 332 for a walking route request while other user preferences may be included in a driving route request. Safe transit route generation system 120 therefore determines a relevancy of one or more user preferences 314, 416 of a user's risk profile 310 for inclusion in calculating risk aversion value 332 for a route request. The relevancy of user preferences 314, 316 for inclusion in risk aversion value 332 may be based on any aspect of the route request, including but not limited to, a mode of travel, a time of day, a preference of road or surface conditions, a distance of the route request (a short trip versus a route that will take multiple hours to travel), and the like. In this manner, risk aversion value 332 for the user and based on the route request are based on any number of user preferences 314, 316 included in user's risk profile 310 relevant to the route requested.

An initial transit route is determined in operation 608 between the origination location and the destination location. In the implementation in which the initial transit route is provided by route display device 404 or user device 406, safe transit route generation system 120 utilizes the received transit route as the initial route. In another implementation, safe transit route generation system 120 generates the initial transit route between the locations with initial route generator 328 utilizing any known or hereafter developed routing technique. To determine the route, safe transit route generation system 120 considers an indicated mode of transportation (e.g., bicycle, vehicle, walking, etc.), mapping technology obtained from one or more map databases, and/or characteristics of possible pathways (e.g., type of roadway, direction of traffic, speed limits, etc.).

Figure 7A:
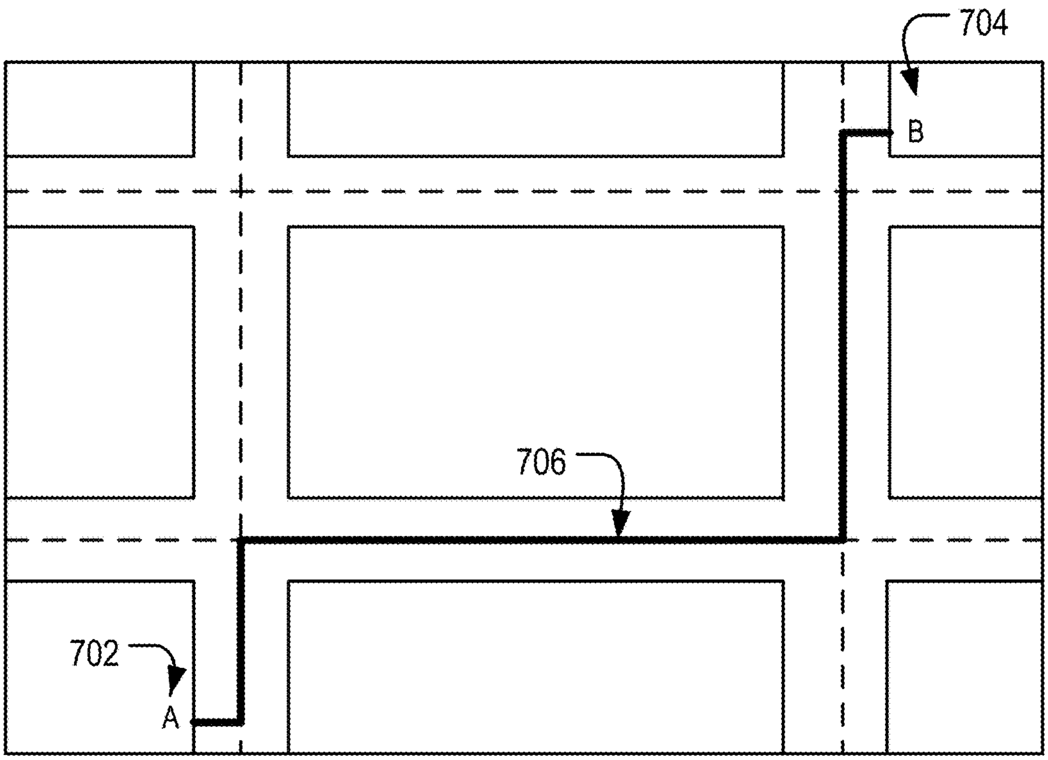
FIGS. 7A-7C illustrate respective schematic diagrams, showing route alterations from an initial transit route based on a user risk profile and monitored safety conditions of a route.

FIG. 7A illustrates an overhead diagram of a simplified initial route between an origination location (location A 702) to destination location (location B 704). The determined initial route is illustrated as bold line 706. As mentioned above, initial transit route 706 is based on faster travel time or shortest distance between locations 702, 704. Initial transit route 706 may also include instructions for traversing the route, such as turn-by-turn instructions, as well as other information to aid a user to traverse the route.

Figure 7B:
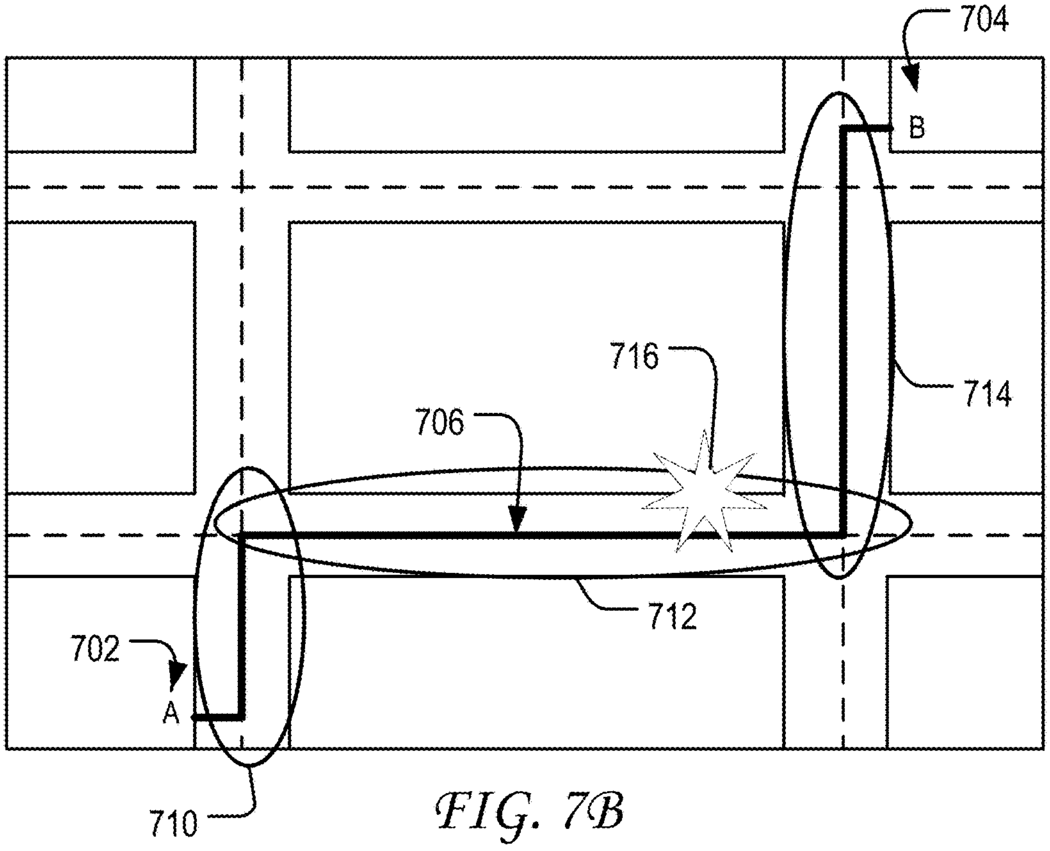

Initial transit route 706 is segmented, utilizing route segmentor 322 of route generation module/engine 306 module of safe transit route generation system 120 in operation 610. Initial transit route 706 is segmented based on any criteria. For example, initial transit route 706 may be segmented based on the turn-by-turn instructions for traversing the transit route. Using the example route 706 of FIG. 7A, FIG. 7B illustrates an overhead diagram of simplified initial route 706 between an origination location (location A 702) to destination location (location B 704). Transit route 706 is segmented in FIG. 7B into route segment 710, route segment 712, and route segment 714. These segments 710-714 follow the turn-by-turn instructions that are provided to traverse initial route 706, such as follow route segment 710, turn right onto route segment 712, and turn left onto route segment 714 until destination B 704 is reached. In this manner, initial transit route 706 is segmented into three segments.

It should be appreciated that an initial transit route may be segmented into any number of segments and based on other criteria. For example, the initial route may be segmented based on road type (freeway, residential, one-way), distance, different modes of transportation, speeds, and the like. Different users of safe transit route generation system 120 may select different segmentation techniques or the safe transit route generation system may select different segmentation techniques based on time of day, geographic area of the initial route, risk profile 310 of a requesting user, or any other criteria or information of the safe transit route generation system.

For a first segment of the initial transit route, one or more safety conditions are obtained in operation 612. In particular, route generation module/engine 306 accesses route safety database 308 associated with the first route segment. For example, historic crime data near the geographic location of the first segment, historic data of accidents along the first segment, a road type and/or quality of the first segment, current weather conditions, indications of a pathogen outbreak in the geographic area, news alerts of unsafe events occurring along the first segment, etc. is obtained or accessed from route safety monitor/database 302. In general, any safety information or data associated with the first route segment may be obtained or accessed, either from route safety database 308 or from one or more external databases. Such information may be limited to the geographic area near or around the first route segment and may, in some instances, be quantified with a numeric value indicating a relative severity of the safety condition.

Similar to risk aversion value 332, a route safety value for the segment is calculated based on the obtained or accessed safety information associated with the route segment. The route safety value includes a combination of both static safety condition information 318 and dynamic safety condition information 320 of the route safety data, as described above. In one implementation, the route safety value for the route segment is a quantification of the various route safety conditions from route safety database 308. In one example, the information of route safety database 308, both static safety conditions 318 and dynamic safety conditions 320, is associated with a numeric value indicating a severity of the condition. The calculated route safety value translates the quantifications of the safety conditions of route safety database 308 into a normalization scale of values. For example, the numeric values of the safety conditions may be summed and the sum divided by a value of 10 to achieve a route safety value between 0 and 10. Various other techniques and methods for quantifying the safety conditions of route safety database 308 into a route safety value for a segment may also be implemented in safe transit route generation system 120 and the techniques described herein are but an example of such quantification.

Using the example route 706 of FIG. 7B, a route safety value is calculated for first segment 710. Such a route safety value may be based on safety conditions of the roadway on or near route segment 710, such as historic crime data along the stretch of road of the segment, historic data of accidents along the segment, a road type and/or quality of the segment, news alerts of unsafe events occurring along the first segment, and the like, or any other safety condition information of route safety database 308.

Score comparator 324 of route generation module/engine 306, in operation 616, determines if the route safety value associated with the route segment exceeds the risk aversion value associated with the user requesting the safe transit route. It should be appreciated, however, that any type of comparison of the route safety value associated with the route segment exceeds the risk aversion value associated with the user requesting the safe transit route may be conducted to determine if the quantified safety of the route segment exceeds the user's safety preferences, including if the risk aversion value is less than a lower safety threshold for the route segment.

Assuming the route safety value for the segment does not exceed user's risk aversion value 332 for the user, safe transit route generation system 120 determines if additional segments of the initial transit route remain to be analyzed in operation 620. For example and using initial transit route 706 of FIG. 7B, safe transit route generation system 120 may determine that the safety value for segment 710 does not exceed user's risk aversion value 332, indicating that the segment is safe for the user based on the user's preferences. In such instances, safe transit route generation system 120 returns to operation 612 and obtain the route safety conditions for the next segment 712 in initial route 706 and repeat operations 612-616 for next segment 712. Operations 612-616 are repeated for each segment in the initial transit route if the safety value for each segment does not exceed user's risk aversion value 332.

If safe transit route generation system 120 determines, in operation 616, that the route safety value exceeds the user's risk aversion value (indicating that safety conditions of the route segment may exceed a user's safety preferences), a replacement route segment is selected for inclusion in the transit route to make the route safer for the user in operation 618. For example and with reference to FIG. 7B, safe transit route generation system 120 determines that an event 716 has occurred or is occurring along route segment 712 of transit route 706. Event 716 may be a dynamic safety condition (such as a political protest, report of criminal activity, high levels of air pollution, and the like) or a static safety condition (such as a history of accidents, history of vehicle accidents, high activity of violent crimes, and the like) that may negatively impact the safety of citizens in the vicinity of the event. An indication of the occurrence of event 716 may be included in route safety database 308 and route safety value for the segment 712. The inclusion of the indication of event 716 causes the route safety value to exceed user's risk aversion value 332 as determined in operation 616.

Figure 7C:
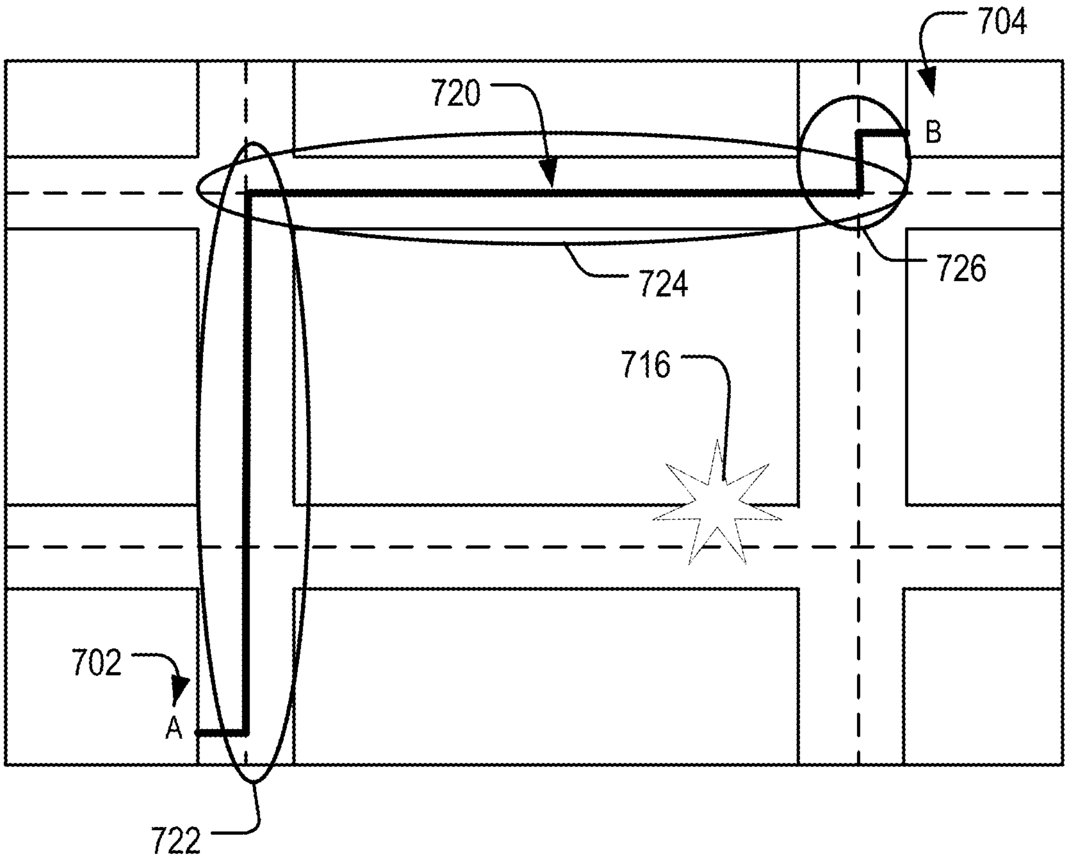

Route generation module/engine 306 of safe transit route generation system 120 stores alternate route segments 326 for inclusion in a transit route when a route safety value of a segment exceeds user's risk aversion value 332. For example, FIGS. 7B and 7C illustrate an overhead diagram of a transit route between an origination location (location A 702) to destination location (location B 704) with the inclusion of an alternate route segment to avoid a potential danger to the traveler along the transit route. As shown in FIG. 7B and discussed above, event 716 may cause segment 712 the route safety value of segment 712 to exceed user's risk aversion value 332. In response, safe transit route generation system 120 replaces route segment 712 with an alternate route segment to bypass the potentially dangerous route segment. For example, alternate route 720 illustrated in FIG. 7C includes route segment 722 to bypass event 716. The inclusion of alternate segment 722 may cause safe transit route generation system 120 to generate a new transit route that incorporates the alternate segment. For example, route generation module/engine 306 may generate a new transit route with the constraint of including alternate route segment 722. The new transit route may therefore include route segment 724 and route segment 726 such that the new transit route connects origination location A 702 to destination location B 704. In this manner, one or more segments of a transit route are replaced with an alternate route segment based on a route safety value and a risk aversion value associated with a user requesting a safe transit route.

Upon replacement of the route segment with an alternate route segment, safe transit route generation system 120 performs operations 612-616 for the replacement route segment to determine if the route safety value of the alternate segment exceeds the risk aversion value for the user. This process continues until all segments of the transit route are replaced with safer segments or otherwise do not exceed the user's risk aversion value 332 as determined in operation 620. Upon verification of each segment in the transit route as compared to risk aversion value 332, safe transit route generation system 120 transmits the safe route to a user device for display in operation 622. For example, safe transit route generation system 120 transmits the safe transit route to the route display device 404 and/or user device 406, among other computing devices associated with the user requesting the safe transit route. In some instances, safe transit route generation system 120 utilizes one or more APIs to transmit the safe transit route to one or more applications executed on a user device, such as route display device 404. Further, safe transit route generation system 120 may transmit, in some implementations, the initial route along with one or more replacement segments of the alternate route for selection by a user via user device 406 or route display device 404. In general, any route information is transmitted to user device 406 or route display device 404. Safe transit route generation system 120 ends the process at operation 624 until a request for a new safe transit route is received.

As explained above, safe transit route generation system 120 refrains from replacing a route segment in certain circumstances in which an alternate route threshold 330 is exceeded. For example, safe transit route generation system 120 may determine that inclusion of an alternate segment in the transit route increases a total trip time for the route by more than 15%. This 15% total trip time increase value may be an alternate route threshold such that, if replacement of a route segment causes the transit route to exceed the alternate route threshold, the alternate segment is not be included into the transit route. Other considerations, such as percentage of the route occurring on a freeway, one or more weights applied to the user preferences of risk profile 310, preferences to particular geographic areas to avoid for the user, distance from a hospital or other healthcare providing services, and the like, may also be included as an alternate route threshold. One or more of the alternate route thresholds may be adjustable by a user of safe transit route generation system 120 to tailor the safe transit route provided to the user. In one instance, the user's selection and/or adjustments to alternate route thresholds is stored in user's risk profile 310. In general, safe transit route generation system 120 may consider any number of thresholds to determine when a route segment should be replaced with an alternate route segment.

Figure 8:
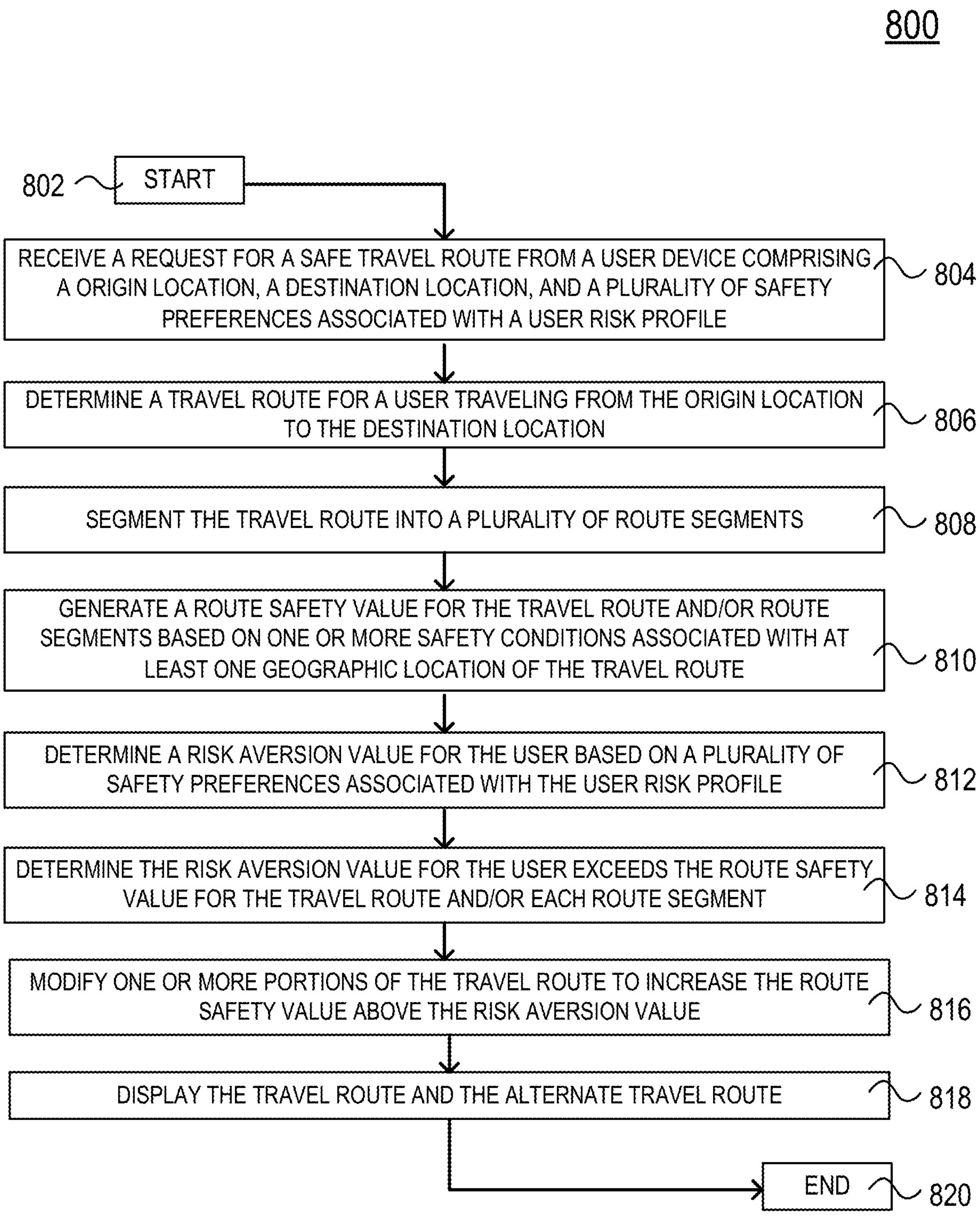
FIG. 8 illustrates an example simplified procedure for safe transit route generation.

FIG. 8 illustrates an example simplified procedure for safe transit route generation in accordance with one or more embodiments described herein. Procedure 800 starts at step 802, and continues to step 804, where, as described in greater detail above, a safe transit route generation system receives a request for a safe travel route from a user device (e.g., device 406 shown in FIG. 4, client devices 110 shown in FIG. 1, etc.). The request includes an origin location, a destination location, and/or a plurality of safety preferences associated with user risk profile. In one example, the user device and the risk profile are associated with the same user. Procedure 800 continues to step 806 where the system determines a travel route for the user traveling from the origin location to the destination location.

Procedure 800 continues to step 808 in which the travel route is segmented into a plurality of route segments. Procedure 800 continues to step 810 in which the system generates a route safety value for the travel route and/or route segments based on one or more safety conditions associated with at least one geographic location of the travel route. The route safety value may be based on various safety conditions associated with the travel route, including but not limited to one of crime data associated with a geographic location of the travel route, an indication of a road quality of a portion of the travel route, or an indication of a health condition associated with the geographic location of the travel route. In one implementation, the travel route is segmented into a plurality of route segments and the system generates a corresponding route safety value for each of the plurality of route segments based on the one or more safety conditions associated with at least one geographic location of each of the plurality of route segments.

At step 812, procedure 800 determines a risk aversion value for the user based on a plurality of safety preferences associated with the user risk profile. The risk aversion value may be based on many safety preferences, such as demographic information of the user, an indication of a user disability, an indication of a vehicle for traveling the travel route, or an indication of a health condition of the user. Additional safety preferences may include an indication of a type of traveler to travel the travel route, an indication of a mode of travel, bio-information associated with the user, or a safety preference received from the user device. In one implementation, one or more relevant safety preferences of the plurality of safety preferences are determined for inclusion in determining the risk aversion value for the user. Relevant safety preferences may be based on such considerations as an indicated mode of travel, a travel time of the travel route, a travel distance of the travel route, or a surface type of travel route.

Procedure 800 continues to step 814 at which the risk aversion value for the user is determined to exceed the route safety value for the travel route and/or each route segment. In the implementation in which the travel route is segmented, the risk aversion value for the user is compared to each of the corresponding route safety values for the plurality of route segments. At step 816, one or more portions of the travel route are modified to increase the route safety value above the risk aversion value. Modification of the travel route to increase the route safety value may include determining an alternative travel route for modification of the one or more portions of the travel route at step 816. At step 818, the travel route and the alternate travel route is displayed on the client device associated with the user.

Procedure 800 subsequently ends at step 820, but may continue on to step 804 where, as discussed above, the system receives another request for a safe travel route from a user device. It should be noted that certain steps within procedure 800 may be optional, and further, the steps shown in FIG. 8 are merely examples for illustration-certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, methods, devices, and systems to create dynamic routes for travel based on the underlying safety of the route. Existing art is based on providing directions between two locations, often focused on areas such as traffic or road considerations. The techniques described herein provide a much broader discussion of travel preferences for safety exploring new ways to create a path based on the needs of the individual user.

While there have been shown and described illustrative embodiments of a stress monitoring and intervention system, it is to be understood that various other adaptations and modifications may be made within the spirit and scope of the embodiments herein. For example, the embodiments have been shown and described herein with relation to a specific system that organizes certain functions into modules or engines. However, the embodiments in their broader sense are not as limited, and may, in fact, be used with any number of applications, devices, and systems as part of a distributed computing network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:

receiving a request for a travel route from a user device associated with a user, the request including at least a destination location and one or more safety preferences of the user;

generating a safety value for the travel route based on one or more safety conditions associated with the travel route;

generating a severity score associated with the one or more safety preferences of the user based on a relevancy of the one or more safety preferences to the travel route;

quantifying a risk aversion value for the user based on the severity score associated with the one or more safety preferences of the user;

comparing the risk aversion value for the user to the safety value for the travel route;

determining the risk aversion value exceeds the safety value for the travel route;

generating a modified travel route to increase the safety value for the travel route above the risk aversion value for the user; and updating the user device to display the modified travel route.

2. The method of claim 1, wherein generating the safety value for the travel route further comprises:

generating a route safety score for each of the one or more safety conditions associated with the travel route based on a severity of each of the one or more safety conditions; and quantifying the safety value for the travel route based on the route safety score for each of the one or more safety conditions.

3. The method of claim 1, further comprising:

segmenting the travel route into one or more route segments; and generating a corresponding route safety value for each of the one or more route segments based on the one or more safety conditions associated with each of the one or more route segments.

4. The method of claim 3, further comprising:

comparing the risk aversion value for the user to each of the corresponding route safety values for the one or more route segments;

determining one or more modified route segments based on the risk aversion value exceeding the corresponding route safety values for the one or more route segments; and updating the travel route to include the one or more modified route segments.

5. The method of claim 4, further comprising:

updating the user device to display the travel route including the one or more modified route segments.

6. The method of claim 1, wherein updating the user device to display the modified travel route further comprises:

displaying both the travel route and the modified travel route on the user device.

7. The method of claim 1, wherein the one or more safety conditions associated with the travel route include at least one of historic crime data, road type, quality of a road surface, weather data, accident reporting data, and new alerts of events occurring in an area of the travel route.

8. A tangible, non-transitory, computer-readable medium having instructions encoded thereon, the instructions, when executed by a processor, are operable to:

receive a request for a travel route from a user device associated with a user, the request including at least a destination location and one or more safety preferences of the user;

generate a safety value for the travel route based on one or more safety conditions associated with the travel route;

generate a severity score associated with the one or more safety preferences of the user based on a relevancy of the one or more safety preferences to the travel route;

quantify a risk aversion value for the user based on the severity score associated with the one or more safety preferences of the user;

compare the risk aversion value for the user to the safety value for the travel route;

determine the risk aversion value exceeds the safety value for the travel route;

generate a modified travel route to increase the safety value for the travel route above the risk aversion value for the user; and update the user device to display the modified travel route.

9. The tangible, non-transitory, computer-readable medium of claim 8, wherein the instructions to generate the safety value for the travel route, when executed by the processor, are further operable to:

generate a route safety score for each of the one or more safety conditions associated with the travel route based on a severity of each of the one or more safety conditions; and quantify the safety value for the travel route based on the route safety score for each of the one or more safety conditions.

10. The tangible, non-transitory, computer-readable medium of claim 8, wherein the instructions, when executed by the processor, are further operable to:

segment the travel route into one or more route segments; and generate a corresponding route safety value for each of the one or more route segments based on the one or more safety conditions associated with each of the one or more route segments.

11. The tangible, non-transitory, computer-readable medium of claim 10, wherein the instructions, when executed by the processor, are further operable to:

compare the risk aversion value for the user to each of the corresponding route safety values for the one or more route segments;

determine one or more modified route segments based on the risk aversion value exceeding the corresponding route safety values for the one or more route segments; and update the travel route to include the one or more modified route segments.

12. The tangible, non-transitory, computer-readable medium of claim 11, wherein the instructions, when executed by the processor, are further operable to:

update the user device to display the travel route including the one or more modified route segments.

13. The tangible, non-transitory, computer-readable medium of claim 8, wherein the instructions to update the user device to display the modified travel, when executed by the processor, are further operable to:

display both the travel route and the modified travel route on the user device.

14. The tangible, non-transitory, computer-readable medium of claim 8, wherein the one or more safety conditions associated with the travel route include at least one of historic crime data, road type, quality of a road surface, weather data, accident reporting data, and new alerts of events occurring in an area of the travel route.

* * * * *